(No Model.)
J. A. MOORE.
Combined Cotton Scraper, Chopper and Cultivator.
No. 237,200. Patented Feb. 1, 1881.
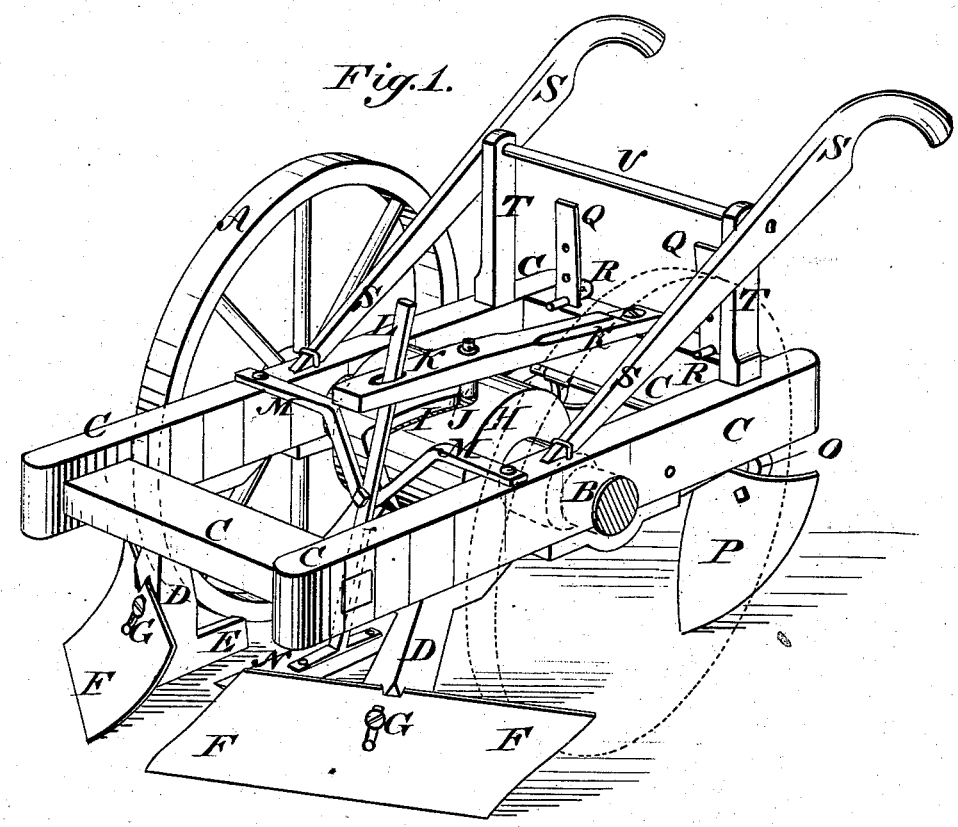
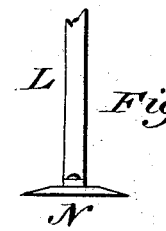
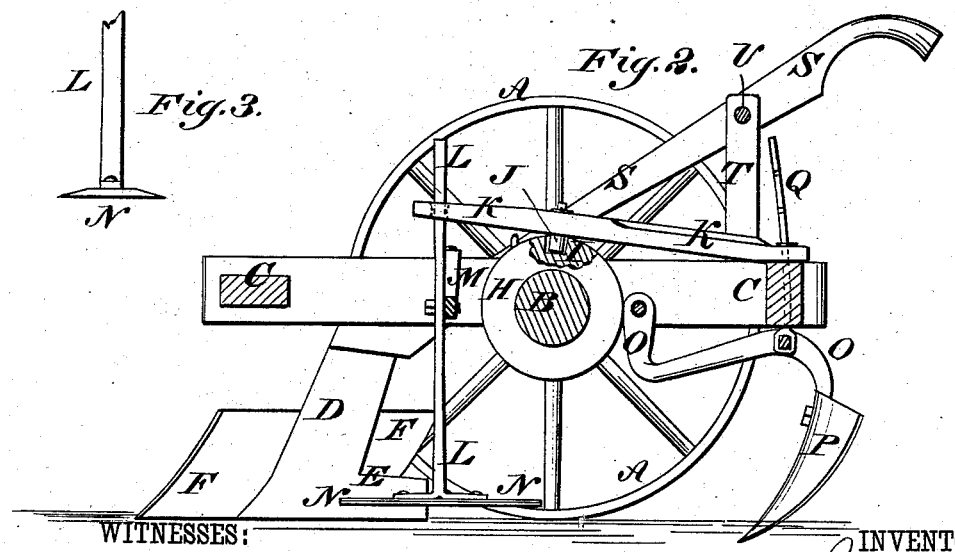
WITNESSES:
Donn P. Twitchell
C. Sedgwick
INVENTOR:
J. A. Moore
BY Munn & Co.
ATTORNEYS.

UNITED STATES PATENT OFFICE.

JOHN A. MOORE, OF WOODVILLE, TENNESSEE.

COMBINED COTTON SCRAPER, CHOPPER, AND CULTIVATOR.

SPECIFICATION forming part of Letters Patent No. 237,200, dated February 1, 1881.

Application filed November 8, 1880. (No model.)

*To all whom it may concern:*

Be it known that I, JOHN A. MOORE, of Woodville, in the county of Haywood and State of Tennessee, have invented a new and useful Improvement in Combined Cotton Scraper, Chopper, and Cultivator, of which the following is a specification.

Figure 1 is a perspective view of the improvement, one of the wheels being removed. Fig. 2 is a sectional side elevation. Fig. 3 is a front view of the chopping-hoe and its lever-handle.

Similar letters of reference indicate corresponding parts.

The object of this invention is to furnish combined scrapers, choppers, and cultivators so constructed that the cotton will be scraped, chopped to a stand, and dirted at one passage along the row, and which can be adjusted to work closer to or farther from the plants, and at any desired depth in the ground.

In the accompanying drawings, A are the wheels, which are attached to the journals of the axle B so as to carry the said axle with them in their revolution. The axle B revolves in bearings attached to the middle parts of the side bars of the frame C, which frame is formed of two side bars and two cross-bars, framed together at their ends.

To the forward parts of the side bars of the frame C are attached the upper ends of two standards, D, which have rearwardly-projecting feet or bars E upon the rear side of their lower ends, and seats for the scrapers F upon the forward sides of their lower ends. The scrapers F are made rhomboidal in form, and are slotted to receive the bolts G, by which they are secured to the standards, so that the scrapers can be moved down as they wear and adjusted to work at any desired depth in the ground. The standards D should be secured adjustably to the frame C, so that the standards can be adjusted to bring the inner ends of the scrapers wider apart or closer together, as may be desired.

To the middle part of the axle B is attached a cylinder or drum, H, in the face of which is formed a zigzag groove, I, to receive a pin, J, attached to the middle part of the lever K, which pin J has a roller placed upon it to diminish the friction between it and the sides of the zigzag groove I. The rear end of the lever K is pivoted to the middle part of the rear cross-bar of the frame C.

In the forward end of the lever K is formed a short slot to receive the lever-handle L, which is pivoted at its middle part to the side of a downward bend formed in the middle part of a cross-bar, M. The ends of the cross-bar M are attached to the side bars of the frame C a little in front of the axle B.

To the lower end of the handle L is attached the center of the chopping-hoe N, which is made of a length equal to the length of the space required to be left between the plants in chopping the cotton to a stand. The chopping-hoe N has an edge upon each side, so as to cut when moving in either direction.

To the side bars of the frame C, a little in the rear of the axle B, is attached the upwardly-projecting ends of the plow-beams O. The beams O incline upward, and are curved downward to bring their rear ends into proper position to receive the dirting-plows P.

To the bends of the plow-beams O are attached the lower ends of the bars Q, which pass up through holes in the rear cross-bar of the frame C, and have a number of holes formed through them to receive the pins R, so that the beams O can be adjusted to cause the plows P to work at any desired depth in the ground.

Several holes may be formed in the rear cross-bar of the frame C to receive the bars Q, so that the plows P can be adjusted at any desired distance apart.

S are the handles by means of which the machine is guided. The forward ends of the handles S are attached to the middle parts of the side bars of the frame C, and their middle parts are secured to the upper ends of the uprights P by a round, U, which passes through the said uprights and handles.

With this construction, as the machine is drawn forward along a row of plants the scraper F scrapes the weeds, grass, and soil away from the plants, the chopping-hoe N, by its vibration, chops the plants to a stand, and the plows P throw the soil back around the plants or dirt them. Any one, or any two, or all three of these operations may be performed at a time, as may be desired.

It will be observed that the axle B is made of such a length that the wheels A run directly in the rear of the scrapers F, and thus always have a smooth path, so that the chopping-hoe N will always cut to the same depth.

I am aware that a scraper, chopper, and dirter have been combined in the same machine, and that a chopper has been operated by a zigzag groove in an axle-drum; but

What I claim is—

In a cotton-chopper, the horizontal lever K, fulcrumed at its rear end to the cross-bar of frame C, having a front slot and provided with a median pin operated in a cam-groove of axle-drum H, in combination with the middle-pivoted chopper L N, as and for the purpose specified.

JOHN ALFRED MOORE.

Witnesses:
W. B. McCALPIN,
I. L. HENDREN.